United States Patent
Baker et al.

(10) Patent No.: US 12,277,516 B2
(45) Date of Patent: Apr. 15, 2025

(54) SYSTEMS, METHODS, AND APPARATUS FOR EFFICIENT VEHICLE FLEET TRACKING, DEPLOYMENT, AND MANAGEMENT

(71) Applicant: Fleetwatcher, LLC, Indianapolis, IN (US)

(72) Inventors: Lawrence G. Baker, Cincinnati, OH (US); Jonnie Ward Emmons, Indianapolis, IN (US)

(73) Assignee: Fleetwatcher, LLC, Indianapolis, IN (US)

( * ) Notice: Subject to any disclaimer, the term of this patent is extended or adjusted under 35 U.S.C. 154(b) by 0 days.

(21) Appl. No.: 17/493,778

(22) Filed: Oct. 4, 2021

(65) Prior Publication Data

US 2022/0180271 A1    Jun. 9, 2022

Related U.S. Application Data

(63) Continuation of application No. 15/164,476, filed on May 25, 2016, now abandoned.
(Continued)

(51) Int. Cl.
*G06Q 10/0631* (2023.01)
*G08G 1/00* (2006.01)
(Continued)

(52) U.S. Cl.
CPC .  *G06Q 10/06312* (2013.01); *G06Q 10/06313* (2013.01); *G08G 1/207* (2013.01);
(Continued)

(58) Field of Classification Search
None
See application file for complete search history.

(56) References Cited

U.S. PATENT DOCUMENTS

2001/0047285 A1* 11/2001 Borders ........... G06Q 10/06315
                                                     705/7.24
2008/0048890 A1*  2/2008 Sheha .................. H04W 4/027
                                                     340/995.1
(Continued)

FOREIGN PATENT DOCUMENTS

CA          2842842 A1 *  1/2013   ....... G06Q 10/06398

OTHER PUBLICATIONS

K. Hausknecht et al., Real-time Urban Transportation Service Tracking and Monitoring, MIPRO 2011, May 23-27, 2011, Opatija, Croatia (Year: 2011).*

*Primary Examiner* — Jerry O'Connor
*Assistant Examiner* — Matthew H Divelbiss
(74) *Attorney, Agent, or Firm* — Woodard Emhardt Henry Reeves & Wagner LLP

(57) ABSTRACT

Methods, systems, and apparatus, including computer programs encoded on a computer storage medium, for efficiently managing fleet asset activities. In one aspect, a method includes establishing a plurality of vehicle activity stages including a source geozone, a destination geozone, a source-destination transit geozone, and a destination-source transit geozone; receiving sensed data from a sensor over a network, where the sensor is situated on an asset; storing the sensed data in a data store as stored data; generating a time bar display based on the stored data, where the time bar display depicts the asset's location relative to the source geozone and the destination geozone; monitoring the time bar display for a deviation from a staggered operating pattern; and sending an update to the asset to correct for the deviations from the staggered operating pattern, where the update brings the asset back into the staggered operating pattern.

20 Claims, 11 Drawing Sheets

Related U.S. Application Data

(60) Provisional application No. 62/141,616, filed on Apr. 1, 2015.

(51) Int. Cl.
*H04W 4/021* (2018.01)
*H04W 4/70* (2018.01)
*G06Q 50/08* (2012.01)

(52) U.S. Cl.
CPC ............ *H04W 4/021* (2013.01); *H04W 4/70* (2018.02); *G06Q 50/08* (2013.01)

(56) References Cited

U.S. PATENT DOCUMENTS

| | | | |
|---|---|---|---|
| 2010/0100507 A1* | 4/2010 | Davidson | G06Q 10/08 |
| | | | 705/417 |
| 2012/0246039 A1 | 9/2012 | Fain et al. | |
| 2012/0253548 A1* | 10/2012 | Davidson | G06Q 10/06398 |
| | | | 701/1 |

* cited by examiner

Fig. 7A

| Cycle Start Time | Source Geo-zone | Dest Geo-zone | Time in Source | Time to Dest | Time in Dest | Time to Next Source | Total Time |
|---|---|---|---|---|---|---|---|
| 2013-04-15 18:11:32 | OTC | Job 720463 OTC - OTC 39 13-42 | 34 | 8 | 14 | | 56 |
| | | Job 720463 OTC - OTC 39 13-42 | | | 41 | 8 | 49 |
| 2013-04-15 19:58:32 | OTC | Job 720463 OTC - OTC 39 13-42 | 24 | 9 | 13 | | 46 |
| | | Job 720463 OTC - OTC 39 13-42 | | | 46 | 7 | 55 |
| 2013-04-15 21:42:32 | OTC | Job 720463 OTC - OTC 39 13-42 | 37 | 7 | 13 | | 57 |
| | | Job 720463 OTC - OTC 39 13-42 | | | 43 | 7 | 50 |
| 2013-04-15 23:32:32 | OTC | Job 720463 OTC - OTC 39 13-42 | 22 | 7 | 12 | | 41 |
| | | Job 720463 OTC - OTC 39 13-42 | | | 41 | 7 | 48 |
| 2013-04-16 01:04:32 | OTC | Job 720463 OTC - OTC 39 13-42 | 24 | 8 | 13 | | 45 |
| | | Job 720463 OTC - OTC 39 13-42 | | | 45 | 7 | 42 |
| 2013-04-16 02:43:32 | OTC | Job 720463 OTC - OTC 39 13-42 | 34 | 8 | 14 | | 56 |
| | | Job 720463 OTC - OTC 39 13-42 | | | 60 | | 60 |
| Totals | | | 175 | 47 | 357 | 36 | 615 |
| Averages | | | 14 | 3 | 29 | 3 | 51 |

770

780

Stop Moving
~9 mins
9:16pm to
9:25pm

| Cycle Start Time | Source Geo-zone | Dest Geo-zone | Time in Source | Time to Dest | Time in Dest | Time to Next Source | Total Time |
|---|---|---|---|---|---|---|---|
| 2014-04-23 06:37:58 | asphalt plant 494 | 438005 | 30 | 31 | 16 | 29 | 106 |
| 2014-04-23 08:24:57 | asphalt plant 494 | 438005 | 11 | 26 | 11 | 24 | 72 |
| 2014-04-23 09:36:57 | asphalt plant 494 | 438005 | 20 | 27 | 15 | 26 | 88 |
| 2014-04-23 11:04:57 | asphalt plant 494 | 438005 | 9 | 26 | 26 | 27 | 90 |
| 2014-04-23 12:34:57 | asphalt plant 494 | 438005 | 10 | 29 | 21 | 29 | 89 |
| 2014-04-23 14:03:57 | asphalt plant 494 | 438005 | 6 | 31 | 15 | 28 | 80 |
| 2014-04-23 15:23:57 | - | - | 7 | 30 | 22 | - | 59 |
| Totals | | | 93 | 202 | 126 | 163 | 584 |
| Averages | | | 13 | 28 | 18 | 27 | 83 |

SYSTEMS, METHODS, AND APPARATUS FOR EFFICIENT VEHICLE FLEET TRACKING, DEPLOYMENT, AND MANAGEMENT

CROSS-REFERENCE TO RELATED APPLICATIONS

This application is a continuation of U.S. patent application Ser. No. 15/164,476, filed May 25, 2016; which claims the benefit under 35 U.S.C. § 119(e) of U.S. Patent Application No. 62/141,616; both entitled "SYSTEMS, METHODS, AND APPARATUS FOR EFFICIENT VEHICLE FLEET TRACKING, DEPLOYMENT, AND MANAGEMENT," filed Apr. 1, 2015, the disclosures of all being incorporated herein by reference in their entirety.

BACKGROUND

This specification relates to the field of resource management. More specifically, the present technology is in the technical field of computer-operated vehicle fleet management.

Asset management has long been an issue for both large and small entities. In the modern world, assets are highly mobile and sometimes have great associated costs (e.g., purchase cost, sensitive contents, man-hours, etc.). For companies working on a set schedule to meet deadlines for projects, tracking both these assets is vital for longevity. However, it is also vital to track and manage the individuals using these assets to ensure that schedules are maintained. In the case of construction projects, materials often may be transported in bulk between jobsites, resulting in alternating material oversupply and shortages.

SUMMARY

This specification describes technologies relating to efficient, computer-based management of resources coordinating the allocation of tracked items using technology-based tools.

One embodiment may include a tracking system. More specifically, it may include an asset tracking system using differential geolocation fields and pattern generation. The embodiment may include establishing a plurality of vehicle activity stages including a source geozone, a destination geozone, a source-destination transit geozone, and a destination-source transit geozone, where the source geozone represents a first geographic area, where the destination geozone represents a second geographic area, where the source-destination transit geozone represents a third geographic area connecting the first geographic area and the second geographic area, and where the destination-source transit geozone represents a fourth geographic area connecting the second geographic area and the first geographic area; periodically receiving sensed data from a sensor over a network, where the sensor is situated on an asset; storing the sensed data in a data store as stored data; generating a time bar display based on the stored data, where the time bar display depicts the asset's location relative to the source geozone and the destination geozone; monitoring the time bar display for a deviation from a staggered operating pattern; and sending an update to the asset to correct for the deviations from the staggered operating pattern, where the update brings the asset back into the staggered operating pattern. Further implementations may include generating a quadrant graph display based on the stored data, the quadrant graph display depicting a quantity representing how many assets are located in each respective vehicle activity stage; subgeozones within geozones; and pluralities of geozones, subgeozones, sensors, assets, and/or updates.

With embodiments of the invention, operators of a fleet of vehicles may utilize best practices in monitoring and allocating resources to one or more projects. Each project has a load cycle that models the deployment of resources to the project. The combination of computer processing and real-time tracking provides the ability to manage a large project while approaching optimal utilization in a dynamic and robust environment. By monitoring individual resources in the context of a larger project, and presenting the information in an organized and graphic format that facilitates human understanding of the collected data, both the effectiveness of the resource and the efficiency of the project are enhanced by keeping the resources focused on the load cycle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The above mentioned and other features of embodiments of this invention, and the manner of attaining them, will become more apparent and the invention itself will be better understood by reference to the following description of embodiments of the invention taken in conjunction with the accompanying drawings, wherein:

FIG. 7A depicts a screenshot of an example detailed report interface that may be generated by the vehicle tracking system.

FIG. 7B depicts the detailed report interface of FIG. 7A, further depicting a stoppage window associated with a stoppage indicator.

FIG. 9 depicts a screenshot of an example table replay interface that may be generated by the vehicle tracking system.

Figure 1:
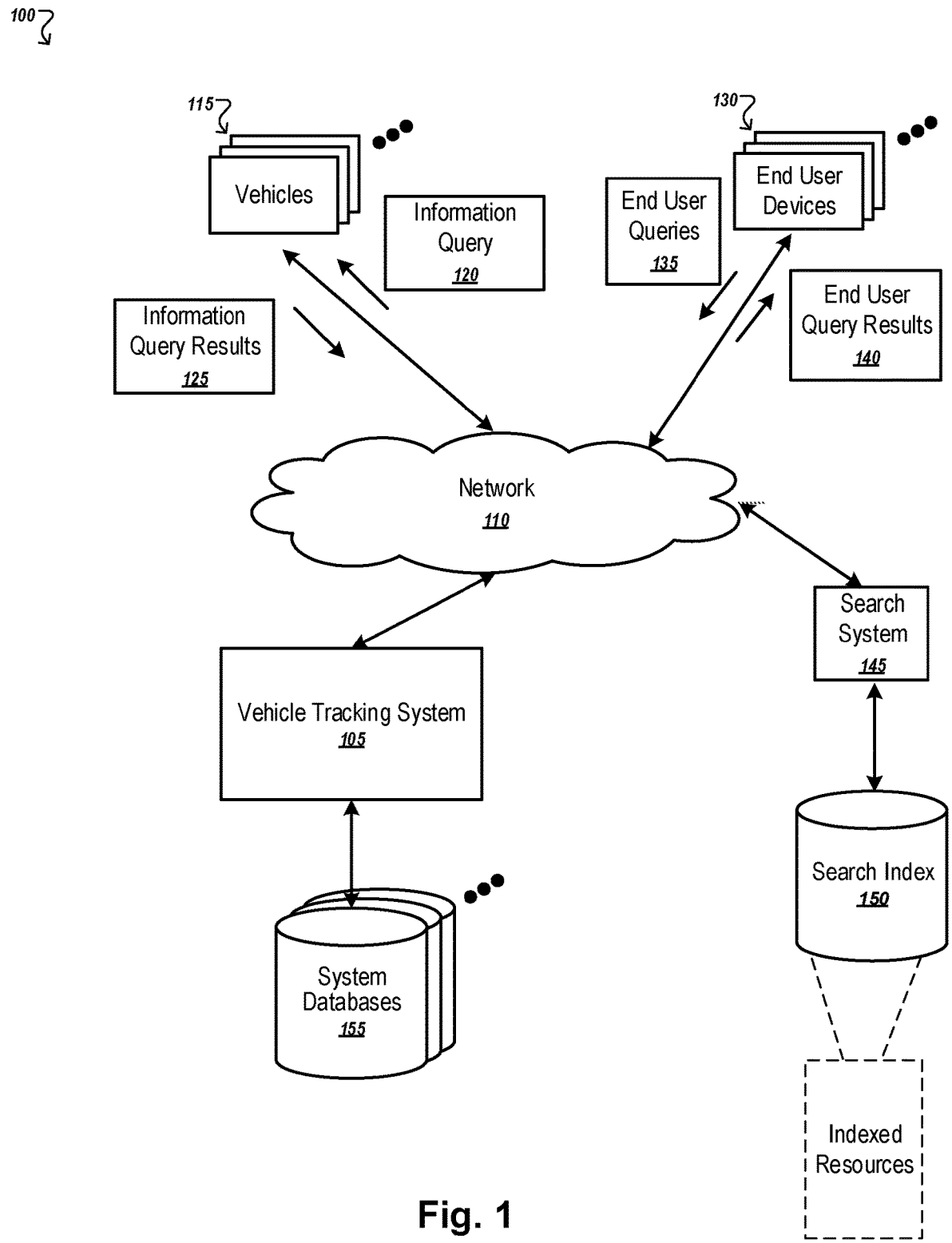
FIG. 1 is a block diagram of an example environment in which the vehicle tracking system may exist.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates embodiments of the invention, in one or more forms, and such exemplifications are not to be construed as limiting the scope of the invention in any manner.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about" it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not. Additionally, "generates," "populates," "generating," and "populating" mean that a vehicle tracking system 105, client, end user (user, system user), and/or module may produce some event or cause some event element to be produced. For example, a webpage may receive data to display in whole or in part to display a valuation estimate to an end user device, the webpage may pull such data from a source other than vehicle tracking system 105 (e.g., other servers, intermediaries, etc.), or vehicle tracking system 105 may entirely provide the valuation estimate to be produced on the webpage.

FIG. 1 is a block diagram of an example environment 100 in which vehicle tracking system 105 may exist. Environment 100 may typically include vehicle tracking system 105; network 110; vehicles 115; end user device(s) 130; end user queries 135; search end user query result(s) 140; search system 145; search index 150; and/or system database(s) 155. Vehicle tracking system 105 may facilitate tracking, storing, analyzing, reporting, and displaying of vehicle statistics being tracked by vehicle tracking system 105. Example environment 100 also includes network 110, such as a local area network (LAN), a wide area network (WAN), the Internet, and/or a combination thereof. Network 110 may connect vehicles 115, end user device(s) 130, and/or vehicle tracking system 105. Example environment 100 may potentially include many thousands of vehicles 115 and/or end user device(s) 130.

Vehicles 115 may be one or more tracked assets associated system 105. For example, vehicles 115 may be semi-trailers, dump-trucks, pickup trucks, cars, and/or the like. Vehicles 115 may typically be fitted with one or more sensors for tracking and/or interface with system 105. In some implementations, vehicles 115 may be remotely configurable using system 105. For example, system 105 may set a route for vehicle 115 to follow, give instructions to vehicle 115 operator, start/stop vehicle 115, and/or the like.

End user devices 130 may be electronic devices that may be under the control of an end user and may be capable of requesting and receiving data over network 110. Example end user devices 130 include personal computers, mobile communication devices, and other devices that may send and receive data over the network 110. End user devices 130 typically include a user application, such as a web browser, to facilitate the sending and receiving of data over the network 110.

In some implementations, vehicles 115, end user devices 130, and/or system 105 may directly intercommunicate, excluding the need for the Internet from the scope of a network 110. For example, the vehicles 115, end user devices 130, and the vehicle tracking system 105 may directly communicate over device-to-device (D2D) communication protocols (e.g., WI-FI DIRECT (WI-FI DIRECT is a registered trademark of Wi-Fi Alliance, a California corporation, located at 10900-B Stonelake Boulevard, Suite 126, Austin, TX 78759); Long Term Evolution (LTE) D2D (LTE is a registered trademark of Institut Européen des Normes; a French nonprofit telecommunication association, located at 650 route des Lucioles, F-06921, Sophia Antipolis, France), LTE Advanced (LTE-A) D2D, etc.), wireless wide area networks, and/or satellite links thus eliminate the need for the network 110 entirely.

In other implementations, the vehicles 115, end user devices 130, and system 105 may communicate indirectly to the exclusion of the Internet from the scope of the network 110 by communicating over wireless wide area networks, satellite links, and/or the like. Further, end user devices 130 may similarly send and receive search end user queries 135 and search end user query results 140 indirectly or directly.

In wireless wide area networks, communication primarily occurs through the transmission of radio signals over analog, digital cellular, and/or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM) (GSM is a registered trademark of GSM MoU Association, a Swiss association, located at Third Floor Block 2, Deansgrande Business Park, Deansgrande, Co Dublin, Ireland), Third Generation (wideband or 3G), Fourth Generation (broadband or 4G), personal digital cellular (PDC), or through packet-data technology over analog systems such as cellular digital packet data (CDPD) used on the Advance Mobile Phone System (AMPS).

The terms "wireless application protocol" and/or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Sun Microsystems, Inc. of Santa Clara, California), BREW (BREW is a registered trademark of Qualcomm Incorporated of San Diego, California), WINDOWS Mobile (WIN- DOWS is a registered trademark of Microsoft Corporation of Redmond, Washington), PALM OS (PALM is a registered trademark of Palm, Inc. of Sunnyvale, California), SYMBIAN OS (SYMBIAN is a registered trademark of Symbian Software Limited Corporation of London, United Kingdom), ANDROID OS (ANDROID is a registered trademark of Google, Inc. of Mountain View, California), and IPHONE OS (IPHONE is a registered trademark of Apple, Inc. of Cupertino, California), and WINDOWS PHONE 7 (WINDOWS PHONE is a registered trademark the Microsoft Corporation of Redmond, Wash.). "Mobile Apps" refers to software programs written for execution with Mobile Software.

Geolocation technologies may provide further information usable by vehicle tracking system 105. Such geolocation technologies may include, for example but not limited to, the U.S.-developed Global Positioning System (GPS), the Russian-developed Global Navigation Satellite System (GLONASS), the proposed European Union Galileo positioning system, India's Indian Regional Navigation Satellite System, the Chinese BeiDou Navigation Satellite System, Assisted-GPS (A-GPS), Radio Frequency Pattern Matching (RFPM), Observed Time Difference of Arrival (O-TDOA), Cell ID (CID), Enhanced Cell ID (ECID), Cell ID+Timing Advance (CID+TA), Internet Protocol (IP) address association, GIMBAL (GIMBAL is a registered trademark of Gimbal, Inc., a Delaware corporation, located at 11010 Roselle Street, Suite 150, San Diego, California 92121), etc. Vehicle tracking system 105 may, for example, attach GPS transceivers to each vehicle 115 in a fleet and/or other assets desirable of efficiently managing; receive, store, process, and/or display vehicle location and temporal data to a fleet manager via Information Query 120 and Information Query Results 125; and the system and/or fleet manager may adjust and/or monitor asset allocations to ensure optimal efficiency.

Vehicle tracking system 105 may use one or more modules to perform various functions including, but not limited to, tracking, searching, analyzing, querying, reporting, interfacing, etc. A "module" refers to a portion of a computer system and/or software program that carries out one or more specific functions and may be used alone or combined with other modules of the same system or program. For example, a module may be located on the vehicle tracking system 105 (e.g., on the servers of system 105, i.e., server-side module), on end user devices 130, or on an intermediary device (e.g., the client server, i.e., a client-side module; another end user device(s) 130; a different server on the network 110; or any other machine capable of direct or indirect communication with system 105, vehicles 115, the search system 145, and/or the end user devices 130.)

In some implementations, system 105 may be performed through system 105 module. For example, a user may install a program to interface with system 105 server to communicate tracking data, scheduling issues, and reports to user's end user device(s) 130. In some other implementations, system 105 may be installed on a user's machine and operate—in whole or in part—independently of system 105 WAN and/or LAN components. For example, system 105 software may be deployed to a user's computer as a stand-alone program that interfaces with the user's computer, creates and maintains data store(s), receives and records tracking information from vehicles 115, generates scheduling alerts, displays schedules and statistics, etc. In another example, system 105 may interact with and/or be installed as an Internet browser extension. For example, system 105 may be a program installed as an extension, add-on, and/or plugin of GOOGLE CHROME (GOOGLE CHROME is a registered trademark of Google, Inc., a Delaware corporation, located at 1600 Amphitheatre Parkway, Mountain View, CA 94043); MOZILLA FIREFOX (MOZILLA and FIREFOX are registered trademarks of the Mozilla Foundation, a California non-profit corporation, located at 313 East Evelyn Avenue, Mountain View, Calif. 94041); APPLE SAFARI (APPLE and SAFARI are registered trademarks of Apple, Inc., a California corporation, located at 1 Infinite Loop, Cupertino, CA 95014), etc. The browser extension may receive tracking data from vehicles 115 with tracking sensors or tracking information databases (e.g., system databases 155), display current tracking system 105 information, receive and generate reports, receive and process search queries, send and/or receive alerts (e.g., via push/pull techniques), etc.

Typically, modules may be coded in JAVASCRIPT, PHP, and/or HTML, but may be created using any known programming language (e.g., BASIC, FORTRAN, C, C++, C#, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, vehicle tracking system 105 may be packaged, distributed, scripted, installed by a technician of system 105, and/or otherwise deployed to a client server location such that system 105 exists within the client server and/or client server network, either in whole or in part. For example, vehicle tracking system 105 may be scripted and/or packaged into an executable package and downloaded by a client administrator; the client administrator then installing system 105 software package(s) onto the client server(s). Such setups may allow vehicle tracking system 105 to operate all system 105 operations entirely within the client server(s) and/or client network, excluding the need to interface with system 105 provider's servers for some or all system 105 functions. Such an implementation may, for example, be used to reduce bandwidth, latency, complexity of network management, etc.

In some other implementations, the client servers may facilitate only some of system 105 functions and interface with system 105 servers (over a network or directly) to enable those remaining functions. Still other implementations may link to system 105 servers to obtain updates, patches, and/or other modifications to system 105 distributions.

Vehicle tracking system 105 software distributions may, in some implementations, be installed in a virtual environment (e.g., HYPER-V (HYPER-V is a registered trademark of Microsoft, a Washington Corporation, located at One Microsoft Way, Redmond, Washington 98052); VIRTUALBOX (VIRTUALBOX is a registered trademark of Oracle America, Inc., a Delaware corporation, located at 500 Oracle Parkway, Redwood Shores, California 94065); VMWARE (VMWARE is a registered trademark of VMWare, Inc., a Delaware corporation, located at 3401 Hillview Ave., Palo Alto, California 94304), etc.).

In other implementations, vehicle tracking system 105 software may be installed in whole or in part on an intermediary system that may be separate from the client and system 105 servers. For example, vehicle tracking system 105 software may be installed by an intermediary worker, a client worker, and/or system 105 worker onto a hosting service (e.g., AMAZON WEB SERVICES (AWS) (AWS is a registered trademark of Amazon Technologies, Inc., a Nevada corporation, located at PO Box 8102, Reno, Nevada 89507), RACKSPACE (RACKSPACE is a registered trademark of Rackspace US, Inc., a Delaware corporation, located at 1 Fanatical Place, City of Windcrest, San Antonio, Texas 78218), etc. The client may then connect to the intermediary and/or system 105 servers to access system 105 functions. Such implementations may, for example, allow distributed access, redundancy, decreased latency, etc.

End user device(s) 130 may request data from vehicles 115. In turn, data may be provided to end user device(s) 130 for presentation by end user device(s) 130. Data may also include data specifying a portion of associated data or a portion of a user display—for example, a small search text box or a presentation location of a pop-up window—in which advertisements or third-party search tools may be presented.

To facilitate searching of data, environment 100 may include a search system 145 that identifies data by crawling and indexing data provided by vehicles 115. Metadata may be indexed based on data to which the data corresponds. The indexed and, optionally, cached copies of data may be stored in, for example, search index 150.

End user device(s) 130 may submit search end user queries 135 to search system 145 over network 110. In response, search system 145 accesses search index 150 to identify data that may be relevant to search end user query 135. Search system 145 identifies data in the form of search end user query result(s) 140 and returns search end user query result(s) 140 to end user devices 130 in search results webpages. A search end user query result(s) 140 may be data generated by the search system 145 that identifies data that may be responsive to a particular search query, and includes a link to data. An example search end user query result(s) 140 may include a webpage title, a snippet of text or a portion of an image extracted from the webpage, and the URL of the webpage.

Users that may be interested in a particular subject may perform a search by submitting one or more end user queries 135 to search system 145 in an effort to identify related information. For example, a user that may be interested in efficiency statistics from Apr. 2, 2014, in Kansas may submit end user queries 135 such as "Kansas," "Apr. 2, 2014 AND Kansas," and/or "Apr. 2, 2014." In response to each of these end user queries 135, the user may be provided search end user query result(s) 140 that have been identified as responsive to the search query—that is, have at least a minimum threshold relevance to the search query, for example, based on cosine similarity measures, clustering techniques, and/or the like. The user may then select one or more of search end user query result(s) 140 to request presentation of a webpage or other data that may be referenced by a URL associated with search end user query result(s) 140.

When search end user query result(s) 140 are requested by end user device(s) 130, vehicle tracking system 105 may receive a request for data to be provided with returned data or search end user query results 140. In response to the request, vehicle tracking system 105 selects data that are determined to be relevant to the search query. In turn, the selected data are provided to end user device(s) 130 for presentation with search end user query results 140.

For example, in response to the search query "gravel pit," system 105 may present the user with relevant gravel pit and/or gravel-related results. If the user selects—for example, by clicking or touching—search end user query result(s) 140, end user device(s) 130 may be redirected, for example, to a webpage containing locations of gravel pits in an area. This webpage may include, for example, operating hours, location on map, distance, and/or the like.

Environment 100 may also include system database(s) 155 to receive and record information regarding vehicle tracking system 105, vehicles 115, end user devices 130, and/or any other data useful to environment 100. For example, information regarding end user devices 130 and end user identifiers may be stored and analyzed to determine user activity on vehicles 115 and/or system 105.

In some implementations, data that may be stored in system database(s) 155 may be anonymized to protect the identity of the user with which the user data may be associated. For example, user identifiers may be removed from the user data to provide to third-party clients. Alternatively, the user data may be associated with a hash value of the user identifier to anonymize the user identifier.

In some other implementations, data are only stored for users that opt-in to having their data stored. For example, a user may be provided an opt-in/opt-out user interface that allows the user to specify whether they approve storage of data associated with the user.

While system 105 may operate with only one of each component (e.g., one system 105, one vehicle 115, one end user, one end user device 130, etc.), system 105 may be benefitted by multiple of these components (and/or in some instances greatly benefitted by a mass amount of said components). For example, the existence and tracking of a plurality of vehicles 115 on system 105 may increase worksite interaction data, typical routes, congested routes, most fuel efficient routes, operator driving habits, etc.

Figure 2:
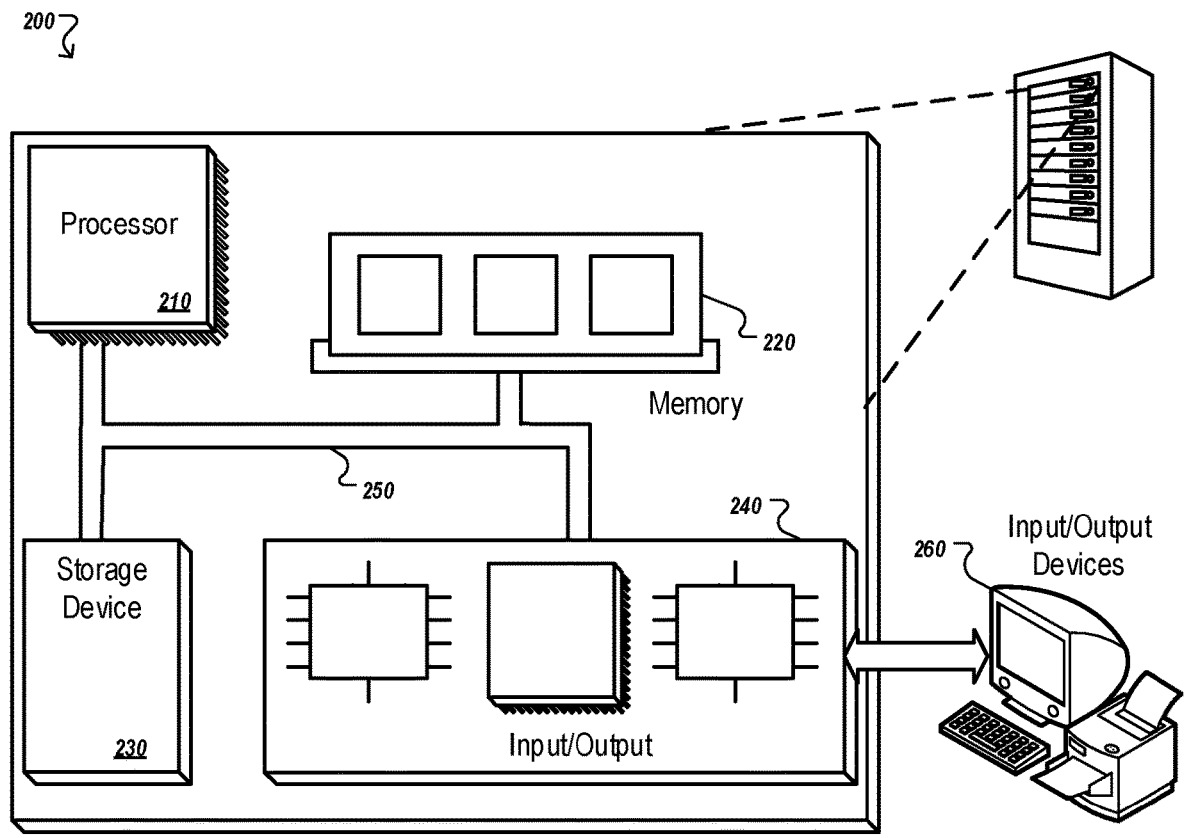
FIG. 2 is a system diagram of an example computer system that may be used to create the vehicle tracking system.

FIG. 2 is a block diagram of an example computer system 200 that may be used to provide vehicle tracking system 105, as described above. System 200 may typically include processor(s) 210; memory 220; storage device(s) 230; system input(s)/output(s) 240; system bus(es) 250; and input/output device(s) 260. Each of components 210, 220, 230, and 240 typically may be interconnected, for example, using system bus(es) 250. Processor(s) 210 may be capable of processing instructions for execution within system 200. In one implementation, processor(s) 210 may be a single-threaded processor. In another implementation, processor(s) 210 may be a multi-threaded processor. In yet another implementation, processor(s) 210 may be a single-core processor, a multiple-core processor, and/or multiple processors (i.e., more than one socketed processor). Processor(s) 210 typically may be capable of processing instructions stored in memory 220 and/or on storage device(s) 230.

Memory 220 stores information within system 200. In one implementation, memory 220 may be a computer-readable medium. In one other implementation, memory 220 may be a volatile memory unit. In another implementation, memory 220 may be a nonvolatile memory unit. In some implementations, memory 220 may be detectable and transportable.

Storage device(s) 230 may be capable of providing mass storage for system 200. In one implementation, storage device(s) 230 may be a computer-readable medium. In various different implementations, storage device(s) 230 may include, for example, a hard disk device, a solid-state disk device, an optical disk device, and/or some other large capacity storage device.

System input(s)/output(s) 240 provide input/output operations for system 200. In one implementation, system input(s)/output(s) 240 may include one or more network interface devices, for example an Ethernet card; a serial communication device, for example an RS-232 port; and/or a wireless interface device, for example an IEEE 802.11 card and/or IEEE 802.15 cards. In another implementation, system input(s)/output(s) 240 may include driver devices configured to receive input data and send output data to other input/output device(s) 260, for example keyboards, printers, display devices, and/or any other input/output device(s) 260. Other implementations, however, may also be used, such as mobile computing devices, mobile communication devices, set-top box television client devices, etc.

Although an example processing system has been described in FIG. 2, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of these. Moreover, while a computer storage medium may not be a propagated signal, a computer storage medium may be a source or destination of computer program instructions encoded in an artificially-generated propagated signal. The computer storage medium may also be, or be included in, one or more separate physical components or media (e.g., multiple CDs, disks, flash drives, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, for example an field programmable gate array (FPGA) or an application-specific integrated circuit (ASIC). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a conventional computer may typically be a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk real-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, WA 98052), IPOD (IPOD is a registered trademark of Apple Inc., a California corporation, located at 1 Infinite Loop, Cupertino, CA 95014), XBOX (e.g., XBOX, XBOX ONE) (XBOX and XBOX ONE are a registered trademarks of Microsoft, a Washington corporation, located at One Microsoft Way, Redmond, WA 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, CA 90949), WII (e.g., WII, WII U) (WII and WII U are registered trademarks of Nintendo of America Inc., a Washington corporation, located at 4600 150th Avenue NE, Redmond, WA 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that may be used by the user; for example, by sending webpages to a web browser on a user's client device in response to requests received from the web browser.

Some embodiments of the subject matter described in this specification may be implemented in computing system 200 that includes a back-end component (e.g., a data server) or that includes a middleware component (e.g., an application server) or that includes a front-end component (e.g., a client computer having a graphical user interface or a Web browser through which a user may interact with an implementation of the subject matter described in this specification) or any combination of one or more such back-end, middleware, or front-end components. The components of computing system 200 may be interconnected by any form or medium of digital data communication, for example a communication network. Examples of communication networks include a local area network (LAN) and a wide area network (WAN), an inter-network (e.g., the Internet), and peer-to-peer networks (e.g., ad-hoc peer-to-peer, direct peer-to-peer, decentralized peer-to-peer, centralized peer-to-peer, etc.).

Computing system 200 may include clients and servers. Clients and servers may typically be remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

Figure 3:
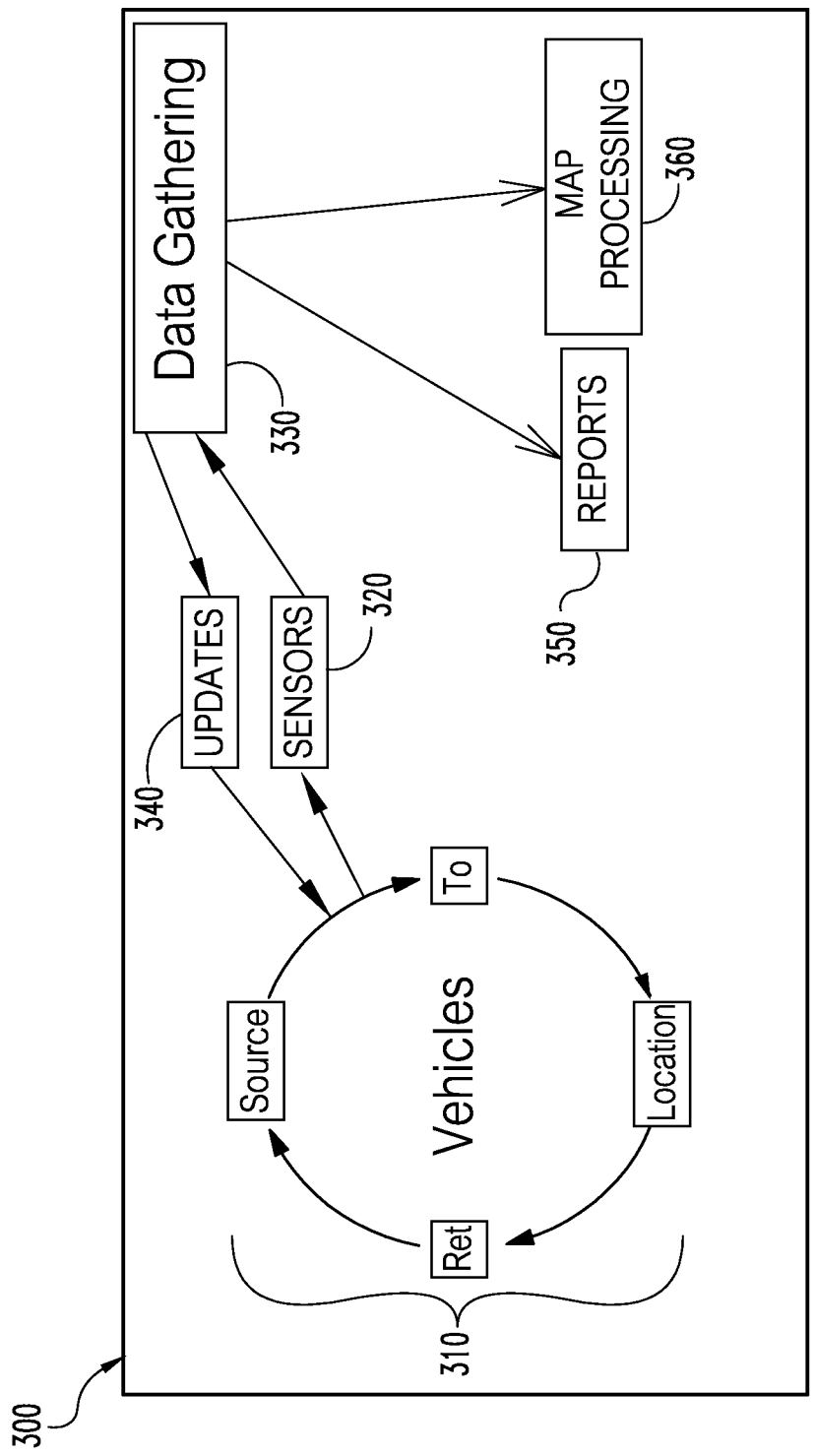
FIG. 3 depicts an example data flow that may be used by the vehicle tracking system.

FIG. 3 depicts an example data flow 300 that may be used by vehicle tracking system 105. Example vehicle tracking system data flow 300 typically may include one or more vehicle activities 310, one or more sensors 320, data gathering apparatus 330, one or more updates 340, reports module 350, and/or map process module 360.

Vehicle activities 310 typically may be monitored with sensors 320 to provide data to data gathering apparatus 330. As vehicle activities 310 progress through the various stages of the desired schedule (e.g., at source, between source and destination, at destination, between destination and source, etc.), sensors 320 communicate sensed data to data gathering apparatus 330, which may then receive, manipulate, display, analyze, store, reference, send, and/or any other desired mechanism with the sensed data. Data gathering apparatus may, for example, store sensed data in system databases 155. Data gathering apparatus 330 may also communicate back to vehicles, modifying vehicle activities 310, with updates 340. Data gathering apparatus 330 may also utilize reports module 350, map process module 360, and/or other modules (e.g., statistical analysis module, scheduling module, etc.) to provide additional functionality to data gathering apparatus 330.

Vehicle activities 310 may include data such as, but not limited to, geolocation, vehicle operation, speed, altitude, and/or any other desired data figures. These data may be used to track progress of a vehicle to a destination, traffic patterns of a fleet, more optimal traffic patterns based on recorded traffic patterns, most fuel efficient routes, congestion at geozones due to overcrowding, underutilization of resources at geozones due to underservice by fleet, etc. Sensors 320 may be, but are not limited to, microphones, position sensors, GPS/geolocation sensors, Hall effect sensors, manifold absolute pressure sensors, mass airflow sensors, oxygen sensors, vehicle speed sensors, throttle position sensors, torque sensors, transmission fluid temperature sensors, radiator temperature sensors, engine oil temperature sensors, start/stop sensors, braking sensors, alternator load sensors, transmission gear position sensor, suspension sensors, load sensors, fuel level sensors, door position sensors, wheel speed sensors, magnetometers, anemometers, barometers, altimeters, gyroscopic sensors, magnetic compass sensors, inclinometers, odometers, load sensors, Doppler sensors, humistors, hygrometers, and/or the like.

In some implementations, sensors 320 may include those already present in vehicles (e.g., braking sensors, speed sensors, etc.) and adapted to further convey (e.g., via 2G, 3G, 4G wireless; satellite; etc.) those sensor readings to data gathering apparatus 330. In other implementations, system 105 may also utilize, query, and send data from sensors on locally carried devices (e.g., smartphone GPS, accelerometers, gyroscopes, etc.). In some further implementations, sensors 320 may be situated in one or more arrays and/or sensor groups to ease and/or streamline installation. In still other implementations, sensors 320 may connect locally to an intermediary device (e.g., a repeater, a smartphone, etc.) before sending sensed data to data gathering apparatus 330.

Data gathering apparatus 330 may then use modules to analyze, store, display, convey, store, convert, and/or otherwise utilize received data. Based on this data, system 105, apparatus 330, and/or an operator (not shown) may update and/or modify vehicle activities 310. For example, drivers may become synchronized instead of staggered, lowering efficiency, and system 105, apparatus 330, and/or operator may indicate a need to restagger operations via update 340 to the offending vehicles. Alternatively, vehicles may be too far out of sync and therefore one must wait to bring proper order back into to the fleet. Such operations may be done on manual, semi-regular, and/or regular intervals.

In some implementations, system 105, data gathering apparatus 330, and/or an operator may be configured to consider a staggered operating pattern as the desired operating pattern. System 105 and/or apparatus 330 may, in some implementations, analyze the pattern depicted on an interface (e.g., graphing interface 500, described elsewhere) and generate an update automatically and/or semi-automatically to correct fleet vehicles and bring the pattern back into the desired (i.e., staggered) operating pattern. Analysis for patterns may, in some implementations, be accomplished using edge detection techniques, calculation of time differences and/or overlap between time bars, and/or the like.

In some other implementations, automated asset scheduling may be enabled with system 105 to track, deploy, and/or maintain asset efficiencies. For example, system 105 may monitor optimal vehicle 115 spacing, frequency, lag, and/or the like to determine one or more optimal routines and/or schedules for vehicle 115 deployment, thus maximizing and/or minimizing system 105 and/or vehicle 115 parameters to increase efficiencies. In some further implementations, scheduling may be maintained with one or more system 105 interfaces and/or manually, semi-automatically, and/or automatically be triggered. In still further implementations, alarms and/or alerts may be enabled and/or triggered with system 105 based on conformance to and/or deviation from one or more predetermined and/or dynamically set thresholds. For example, if efficiency and/or scheduling drops below a set value (e.g., five minutes wait in a geozone between vehicles, ten percent variance from mean time spent in a geozone, and/or the like), system 105 may generate and/or display an alert on one or more system 105 interfaces and/or generate and/or deliver one or more notifications (e.g., via email, SMS, and/or the like) to system 105 personnel.

In other implementations, predictive features may be implemented by system 105. For example, system 105 may determine, based on historical system 105 data, traffic data, weather data, and/or similar data sources, that a project being tracked by system 105 may operate most efficiently with four vehicles 115 deployed during the morning but then with five vehicles 115 in the afternoon. Alternatively, in another example, system 105 may predict that another project may divert vehicles 115 between geozones on another route due to a recent accident causing delays along the anticipated route. System 105 may also, in some implementations, predict changes to expected times in route, times at each geozone, number of vehicles 115 to assign to maintain optimal efficiency, and/or the like. In still another implementation, system 105 may catalog, compare, and/or otherwise analyze such data in isolation and/or in aggregate.

Some modules may include reporting module 350 and/or map process module 360. Reporting module 350 may, for instance, be able to generate bar, table, and/or quadrant graphs (as might be seen in FIG. 5 or 7A, described elsewhere). These reports may be used to determine inefficiencies, typically in a visual fashion, in the fleet progress, the optimal number of vehicles to operate for a project, statistics regarding individual and/or fleetwide operations, and the like. Reporting module 350 may generate reports using real-time, stored, and/or hypothetical (e.g., based on, but not actual, stored and/or real-time data) data, which may, for example, be stored in system databases 155. Reports may be generated manually, semi-regularly, and/or regularly based on set intervals. Based on these reports, system 105, apparatus 330, and/or an operator may monitor and/or send updates 340. In some implementations, a replay-like display may be generated to sequentially and/or semi-sequentially step through stored data in a report format using media player-type controls.

Figure 8:
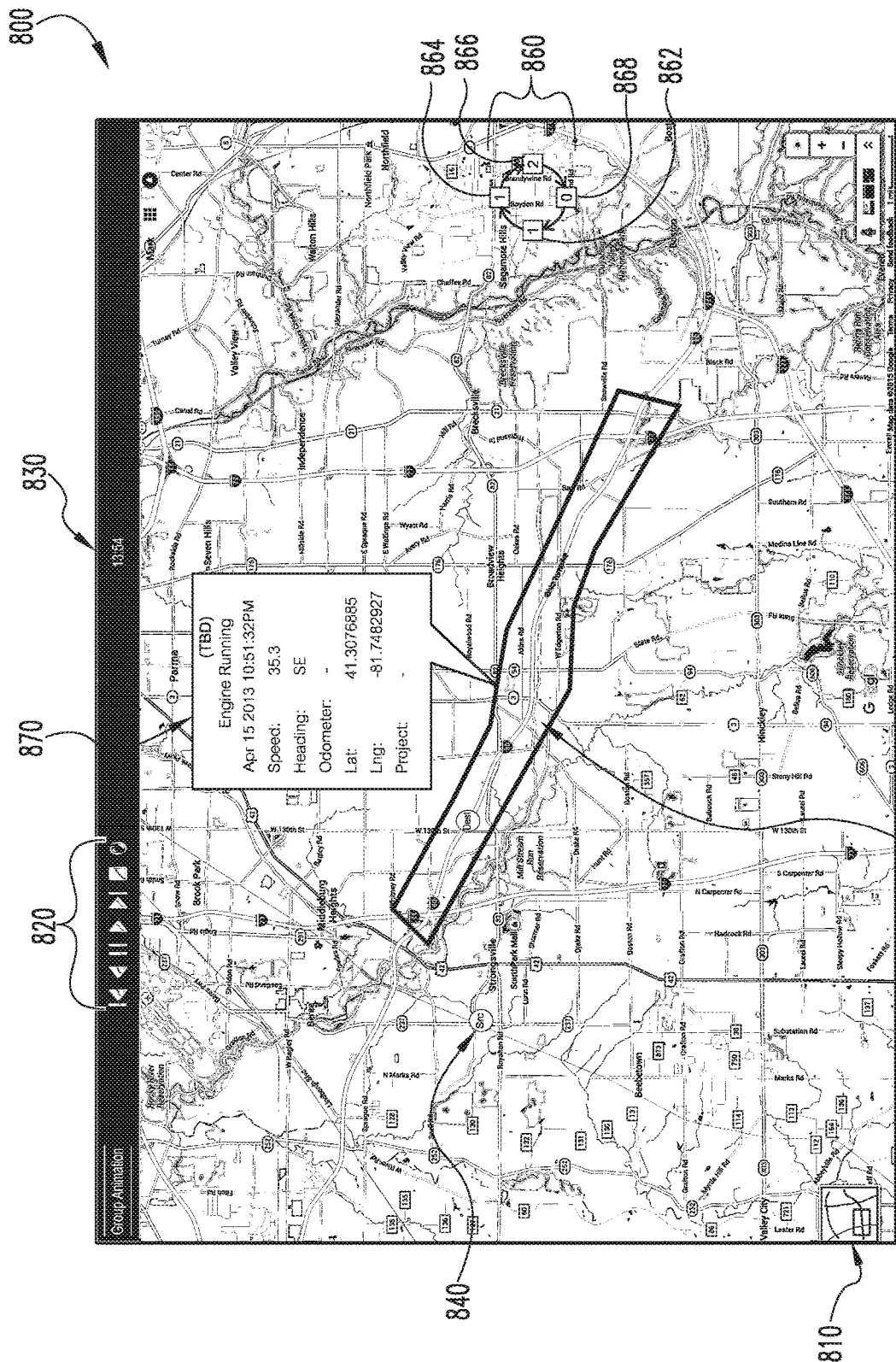
FIG. 8 depicts a screenshot of an example trip map interface that may be generated by the vehicle tracking system.

Map process module 360 may similarly generate displays depicting vehicle activities 310 on a geographical map (e.g., as depicted in FIG. 8, described elsewhere). The generated map may be based, at least in part, upon received, stored, and/or hypothetical data (i.e., the data stored in system databases 155). These generated map overlays may, in some implementations, be coupled with media player-type controls, which may depict the progress (e.g., geographic location, operating statistics, etc.) of vehicle activity 310 for tracked vehicles throughout a period of time.

Figure 4:
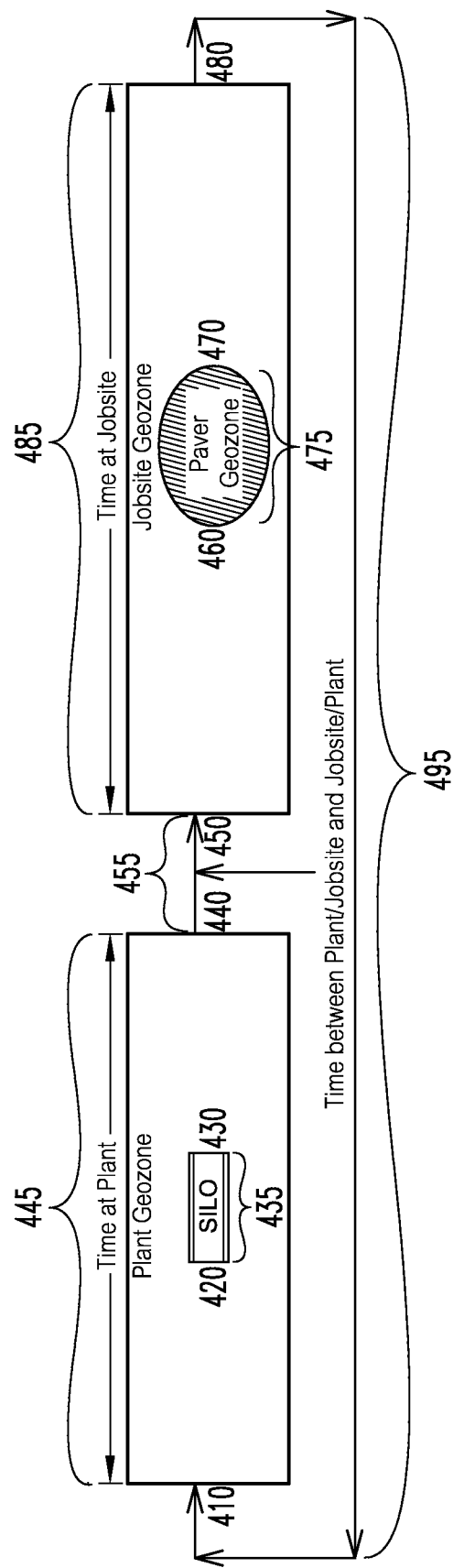
FIG. 4 depicts an example temporal zone flow that the vehicle tracking system may track, store, and report.

FIG. 4 depicts an example temporal zone flow 400 that vehicle tracking system 105 may track, store, and report. Example time zone flow 400 typically may include arrival at source geozone 410, arrival at source subgeozone 420, departure from source subgeozone 430, time spent at source subgeozone 435, departure from source geozone 440, time spent at source geozone 445, arrival at destination geozone 450, time in transit between source geozone and destination geozone 455, arrival at destination subgeozone 460, departure from destination subgeozone 470, time spent at destination subgeozone 475, departure from destination geozone 480, time spent at destination geozone 485, and/or time in transit between destination geozone and source geozone 495.

The total time spent at the source geozone 445 typically may be calculated by determining the time difference between the departure from source geozone 430 and the arrival at source geozone 410. Additionally, time spent at subgeozones (i.e., geozones within one or more larger geozones) may be calculated in a similar fashion. As depicted in FIG. 4, time spent at source subgeozone 435 (e.g., a material silo) typically may be calculated by determining the time difference between departure from that subgeozone (e.g., departure from source subgeozone 430) and arrival at that subgeozone (e.g., arrival at source subgeozone 420).

Time between the source geozone (e.g., a materials warehouse) and the destination geozone (e.g., a jobsite) may be represented as time in transit between source geozone and destination geozone 455. Time in transit between source geozone and destination geozone 455 typically may be calculated by determining the time difference between arrival at destination geozone 450 and departure from source geozone 440. In some implementations, transit between geozones may simply be a single stage, whereas in other implementations, transit may consist of multiple stages. For example, travel to highway, travel on highway, travel to destination, and the like.

The total time spent at destination geozone 485 typically may be calculated similarly to the process while at the source geozone, by determining the time difference between departure from destination geozone 480 and arrival at destination geozone 450. Further, time spent at destination subgeozone 475 typically may be determined by determining the time difference between departure from destination subgeozone 470 and arrival at destination subgeozone 460.

Time between the destination geozone (e.g., a jobsite) and the source geozone (e.g., a jobsite) may be represented as time in transit between destination geozone and source geozone 495. Time in transit between destination geozone and source geozone 495 typically may be calculated by determining the time difference between arrival at source geozone 410 and departure from destination geozone 480. As above, in some implementations, transit between geozones may simply be a single stage, whereas in other implementations, transit may consist of multiple stages. For example, travel to highway, travel on highway, travel to source, and the like.

In some implementations, there may be one or more subgeozones in one or more geozones, while in other implementations, there may be zero subgeozones in a source-to-destination-source routine. In some implementations, there may be sub-subgeozones (or even further granularity of geozones) within geozones and/or subgeozones. For example, a source geozone may consist of subgeozone A and subgeozone B, wherein subgeozone A further consists of sub-subgeozone Z, and wherein sub-subgeozone Z further consists of sub-sub-subgeozone Y.

In some other implementations, system 105 and/or apparatus 330 may track each granularity step of geozone, wherein other implementations may simply track a subset thereof. In some further implementations, one or more granularities of geozones and/or subgeozones may be one or more vehicles 115 themselves.

Figure 5:
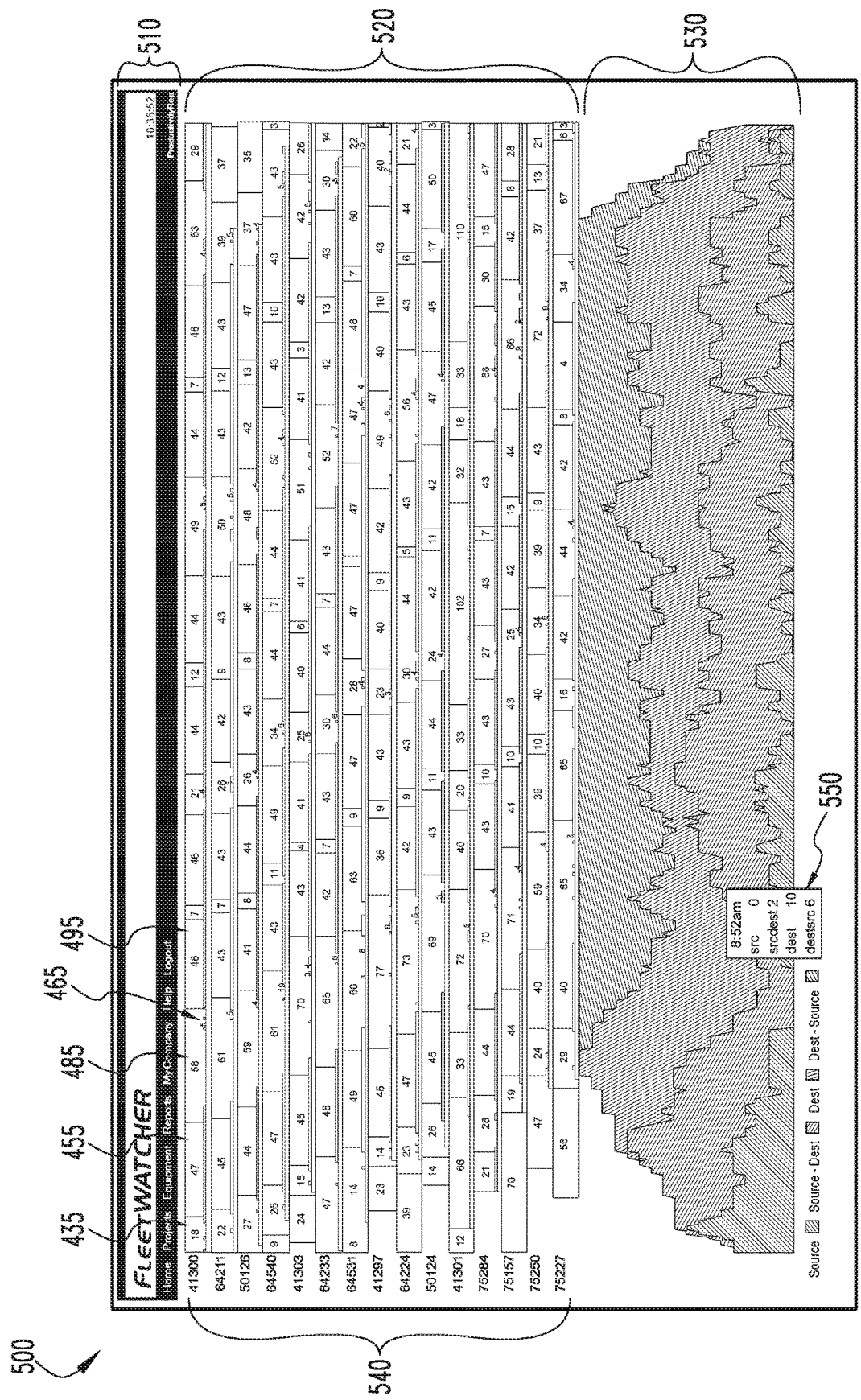
FIG. 5 depicts a screenshot of an example graphing interface that may be generated by the vehicle tracking system.

FIG. 5 depicts a screenshot of an example graphing interface 500 that may be generated by vehicle tracking system 105. Example vehicle tracking system graphing interface 500 typically may include interface header 510, time bars 520, quadrant graph 530, vehicle identifiers 540, and/or quadrant graph statistics window 550.

Graphing interface 500 typically may be generated using a system 105 module (e.g., reports module 350) from collected vehicle activity 310 data. Generation of graphs for graphing interface 500 may be real-time (as data is collected and sent to data processing apparatus 330), semi-regularly, and/or regularly.

Graphing interface 500 typically includes interface header 510, which displays and allows selection of various graphing interface 500 and system 105 parameters. For example, interface header may include selections such as, but not limited to, "Home," "Projects," "Equipment," "Reports," "My Company," "Help," "Logout," and/or the like. Selecting each of these may allow the user to browse to a separate interface (e.g., detailed report interface 700, described elsewhere), a different part of the same interface (e.g., expand quadrant graph 530), generate a new window (e.g., pop up Help window), and the like.

Time bars 520 and quadrant graph 530 typically may be generated by system 105 to depict vehicle activities 310 in a readily understandable visual format. Time bars 520 typically may depict each tracked vehicle for a project as individual rows. Each individual time bar 520 may then be labeled with a vehicle identifier 540 and shaded such that each like-shaded bar 520 section represents a different portion of vehicle activities (e.g., geozone, transit between geozones, etc.). For example, FIG. 5 depicts a first section corresponding to time at source geozone 435, a second section corresponding to transit from source geozone to destination geozone 455, a third section corresponding to time at destination subgeozone 465, a fourth section corresponding to time at destination geozone 485, and a fifth section corresponding to time in transit from destination geozone to source geozone 495.

Based on the presented time bars 520, system 105, data gathering apparatus 330 (and/or an associated module), an operator may analyze the efficiency of vehicle activity 310 for a fleet and determine if any modifications to vehicle activity 310 via updates 340 should be made. Ideally, time bars 520 should be depicted as a "stair step" type pattern, such that the location and associated activity of each fleet vehicle is staggered slightly from those vehicles before and after that vehicle. If a vehicle deviates from this expected pattern, time bars 520 may typically allow corrections to bring the pattern back into alignment. In some implementations, these corrections may be automated, semi-automated, and/or manually triggered and/or implemented.

Quadrant graph 530 ("quad graph") typically, but not always, may be presented below time bars 520. Quad graph 530 typically may depict a histogram or line graph wherein the x-axis represents the same time period as in time bars 520 and the y-axis represents number of vehicles active in the tracked fleet. Each distinct portion of the quadrant graph (e.g., depicted in FIG. 5 as distinctly shaded sections, but could be distinctly identifiably by shape, marker, pattern, and the like) may correspond to all, or a subset of, time bar 520 sections, described above. Thus, at each time on the X-axis, quad graph 530 depicts the number of vehicles in each portion of vehicle activity 310, as well as the total number of vehicles transmitting vehicle activity 310 at that point in time.

In some implementations, a legend (depicted in FIG. 5 below quad graph 530, but could be generated anywhere on an interface) may allow easy identification of each quad graph 530 section. In some further implementations, these legend identifiers may correspond in whole or in part with time bar 520 sections.

In some other implementations, quadrant graph statistics window 550 may be generated and/or presented by an operator selecting a point on quad graph 530. Upon selection of a point, quadrant graph statistics window 550 may be generated (e.g., as a pop-up, pop-under, etc.) and display information associated with that point in time. For example, window 550 may list the selected time, the number of vehicles at each vehicle activity 310 stage, the average time that each vehicle has been in each vehicle activity 310 stage, and the like.

In some further implementations, animation of all and/or a subset of time bars 520 and/or quad graph 530 may be presented on interface 500. For example, selecting a point in time on either time bars 520 and/or quad graph 530, and then pressing an animation initiator (e.g., an interface button or control, a keyboard button or sequence, double-clicking with an input device, and/or the like) may animate the time bars 520 and/or quad graph 530 display(s). In still further implementations, time bars 520 and/or quad graph 530 may be blanked out before initiating animation, generating the display as the animation progresses, while in other implementations, time bars 520 and/or quad graph 530 may remain generated.

Figure 6:
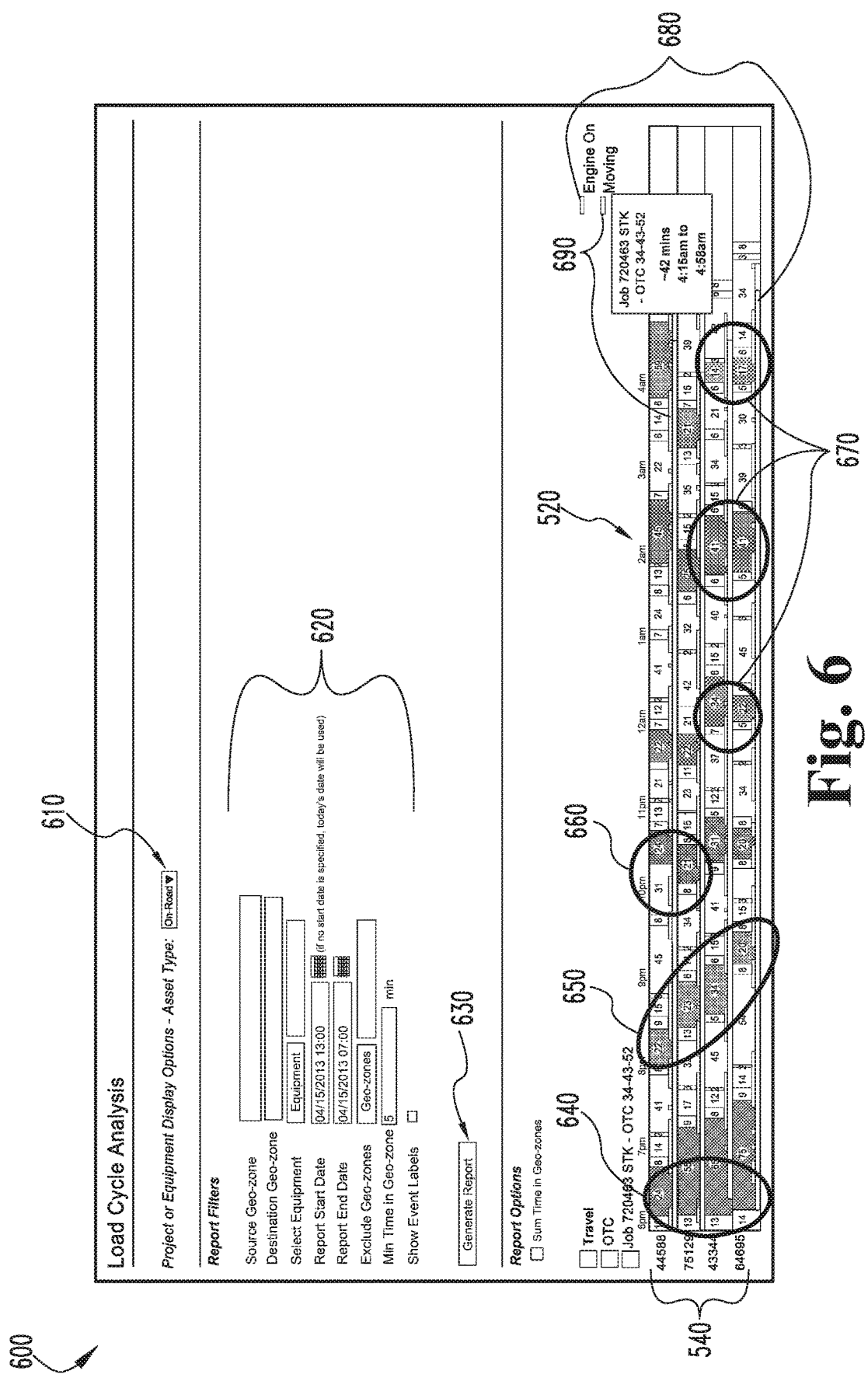
FIG. 6 depicts a screenshot of an example report interface that may be generated by the vehicle tracking system.

FIG. 6 depicts a screenshot of an example report interface 600 that may be generated by vehicle tracking system 105. Report interface 600 typically may include report selector 610, report filters 620, report generation button 630, staggered departure pattern 640, staggered operating pattern 650, reversal pattern 660, syncing pattern 670, ignition indicator 680, and/or movement indicator 690.

Report interface 600 typically may be another interface that is generated by system 105 and/or data gathering apparatus 330. Typically, report interface 600 may be used to generate a report having specific parameters based upon real-time, stored, and/or hypothetical system 105 data. Report selector 610 typically may be used to select a certain type of project, equipment, and/or other type of tracked asset. For example, report selector 610 may allow a user to select between categories such as "On-road" (which may select vehicles having vehicle activities 310 involving travel on roadways), "Pavers" (which may select vehicles that specifically are used in paver projects), "Highway I-69" (which may select vehicles involved in a project titled "Highway I-69" or a subset thereof), and/or any other desired categories. In some implementations, report selector

610 may default to a certain selection (e.g., last selection, most frequent selection, most chronologically active project, etc.).

Report filters 620 typically may act to further narrow report parameters to whatever is desired for presentation in generated report. For example, report filters 620 may include, but are not limited to, "Source Geozone" (which may allow a user to select from stored and/or active Source Geozones); "Destination Geozone" (which may allow a user to select from stored and/or active Destination Geozones); "Select Equipment" (which may allow a user to select certain equipment assets to restrict the report to, such as pavers, dump trucks, backhoes, etc.); "Report Start Date" (which may set the chronological point at which the report and query starts); "Report End Date" (which may set the chronological point at which the report and query ends); "Excluded Geozones" (which may allow a user to specifically exclude certain source and/or destination geozones); Minimum Time in Geozone (which may allow a user to set a floor value on time spent in a specific geozone and/or subsequent geozone granularity); and/or the like. In some implementations, additional report filters 620, such as "Show Event Labels" may be selected to provide additional information to generated reports (e.g., "travel to destination geozone 01234").

Once report filters 620 have been selected, a user may select generate report button 630 to trigger query, populate, and generate operations based on data stored by system 105 and filtered by report filters 620. Typically, time bars 520, quad graph 530, and/or data tables may be generated and presented. As depicted in FIG. 6, time bars 520 have been generated for vehicle identifiers 540. In some implementations, as depicted in FIG. 6, a legend for the generated graphs and/or reports may also be generated (in FIG. 6's case, above time bars 520).

FIG. 6's generated time bar 520 report depicts some of the potential scenarios that system 105, data gathering apparatus 330, and/or an operator may monitor, analyze, and/or correctively account for. For example, staggered departure pattern 640 is depicted at the left-most area of time bars 520. Typically, staggered departure pattern 640 may represent an ideal pattern to be displayed by time bars 520. This may, for example, represent a smooth transition of each tracked vehicle via vehicle activities 310 from one vehicle activity 310 stage to the subsequent stage.

In some implementations, staggered departure pattern 640 may overlap, while in other implementations, there may be little to no overlap (and also little to no inactive gaps) between each tracked asset. Similarly, staggered operating pattern 650 typically may depict a pattern of vehicle activity 310 in which each tracked asset maintains a proper spacing and has little or no overlap at each vehicle activity 310 stage. Thus, as one asset arrives, for example, at the source geozone, the previously arrived asset is leaving (or preparing to leave) from the source geozone.

Some potential problematic issues depicted by time bars 520 in FIG. 6 may be, for example, reversal pattern 660 and/or syncing pattern 670. Reversal pattern 660 may be generated when tracked assets have reversed from their proper order. For example, a first asset experiences traffic congestion, stops for a restroom break, and/or otherwise arrives at its destination chronologically after a second asset. This may occur with only two tracked assets, or it may occur with many assets (e.g., a large traffic jam that later assets route around).

To resolve reversal pattern 660, system 105, data gathering apparatus 330, and/or an operator may initiate an update 340 to direct the first asset's driver to reorient his position. Alternatively, system 105, data gathering apparatus 330, and/or an operator may simply invert the order of the first and second tracked assets. In some implementations, system 105, data gathering apparatus 330, and/or an operator may tag this reversal pattern 660 for performance reviews, efficiency reports, and/or the like to attempt to prevent a similar reversal pattern 660 in the future.

Syncing pattern 670 may be generated when one or more assets leaves staggered operating pattern 650 and synchronizes with one or more other assets. For example, drivers of first and second tracked assets may meet for lunch and then depart from their lunch at the same time, ultimately resulting in loss of staggered departure pattern 640 and/or staggered operating pattern 650. In some extreme examples, an entire fleet may leave at the same time, traveling in a large group to next vehicle activity 310 stage, and negating efficiency benefits of staggered departure pattern 640 and staggered operating pattern 650.

To resolve syncing pattern 670, system 105, data gathering apparatus 330, and/or an operator may, for example, initiate update 340 to direct the synchronized asset drivers to stagger their departure from next vehicle activity 310 stage (e.g., destination geozone). In some implementations, system 105, data gathering apparatus 330, and/or an operator may tag this syncing pattern 670 for performance reviews, efficiency reports, and/or the like to attempt to prevent a similar syncing pattern 670 in the future.

Additionally, in some implementations, a generated report may include and generate additional data, such as ignition indicator 680 and/or movement indicator 690. Ignition indicator 680 typically may depict that a tracked asset (e.g., a truck) has its engine in an ON position. This may, for example, be helpful in determining when tracked assets are wasting fuel while not moving, are stuck in traffic at a standstill, and the like. Further, movement indicator 690 may similarly be included and generated to depict when a tracked asset (e.g., vehicle) is actually moving (e.g., by sensing vehicle speed). This may, for example, help to determine average speed over a trip, when a vehicle is ON but at a standstill, and the like. FIG. 6 depicts ignition indicator 680 and movement indicator 690 as distinct line segments overlaid on time bars 520, but ignition indicator 680 and/or movement indicator 690 may also be generated and depicted in a report with a separate line graph, bar graph, and/or any other suitable display mechanism.

Figure 7A:
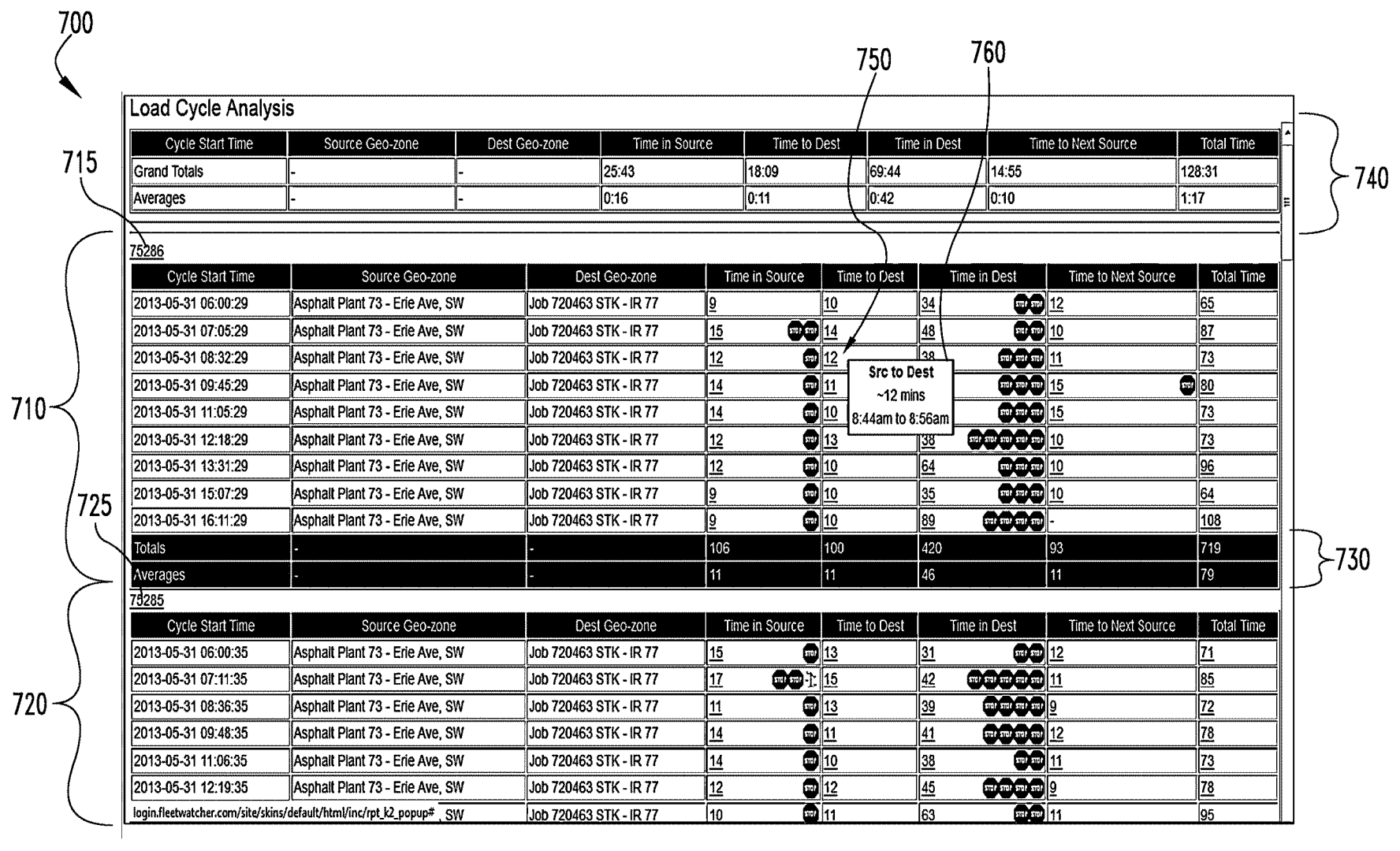

FIG. 7A depicts a screenshot of an example detailed report interface 700 that may be generated by vehicle tracking system 105. Detailed report interface 700 typically may include first vehicle record 710, first vehicle identifier 715, second vehicle record 720, second vehicle identifier 725, first vehicle record statistics 730, detailed report overall statistics 740, trip interval indicator 750, and/or trip interval window 760.

Detailed report interface 700 typically may be structured and generated such that each individual asset's record is separated from each other asset's record. For example, FIG. 7A depicts first vehicle record 710, which corresponds to vehicle activity 310 data from an asset identified with first vehicle identifier 715, disposed above second vehicle record 720, which corresponds to vehicle activity 310 data from an asset identified with second vehicle identifier 730. Each individual asset record may display, for example but not limited to, "Cycle Start Time," "Source Geozone," "Destination Geozone," "Time in Source Geozone," "Time in Destination Geozone," "Time in Next Source," "Total Time," and the like.

Further, in some implementations, below each individual asset record (e.g., first vehicle record 710, second vehicle record 720, etc.), statistics regarding the data contained in each individual asset record may be calculated (e.g., by system 105, data gathering apparatus 330, etc.), generated, and/or situated. In FIG. 7A, first vehicle record statistics 730 is generated and located below first vehicle record 710 and above second vehicle record 720. First vehicle record statistics 730 may, for example but not limited to, display totals, averages, standard deviations, and/or any other statistical figures and/or derivations.

Additionally, in some other implementations, detailed report overall statistics 740 may be generated and displayed on detailed report interface 700. Detailed report overall statistics 740 typically may function similarly to first vehicle record statistics 730 (described above), but typically may correspond to all asset entries listed on detailed report interface 700, rather than only a single asset activity list.

Further, in yet other implementations, trip interval indicator 750 and/or trip interval window 760 may be generated and displayed on detailed report interface 700. Trip interval indicator 750 typically may be presented as a numeral representing the amount of time for the associated vehicle activity 310 stage (e.g., time in source, time in destination, etc.). For example, trip interval indicator 750, as indicated in FIG. 7A, may represent twelve minutes spent in the "Time to Dest[ination]" vehicle activity 310 stage.

Additionally, trip interval window 760 typically may be generated and/or displayed (e.g., as a pop-up window, pop-under window, etc.) upon selecting trip interval indicator 750. For example, trip interval window 760 may appear by mousing over, clicking, and/or otherwise selecting trip interval indicator 750. Trip interval window 760 typically may further detail information associated with trip interval indicator 750. For example, as depicted in FIG. 7A, trip interval indicator 750 corresponds to recorded data that first vehicle identifier 715 was active in a "Src to Dest" (i.e., "Source to Destination") vehicle activity 310 stage for approximately twelve minutes from the time period 8:44 am to 8:56 am. Trip interval window 760 may, in other implementations, include any other helpful information, including but not limited to the date, the source geozone location, the destination geozone location, and/or the like.

In some implementations, trip interval indicator 750 and/or trip interval window 760 may be linked (e.g., with hyperlinks and/or other dynamic and/or static reference calls) to additional displays, reports, and/or interfaces. For example, clicking on trip interval indicator 750 may direct the viewing user to, and/or generate, a map view (e.g., as shown in trip map interface 800, described elsewhere) overlaying the indicated trip interval, the entire trip, the entire day of trips, and/or the like.

FIG. 7B depicts the detailed report interface 700 of FIG. 7A, further depicting stoppage window 780 associated with stoppage indicator 770. Stoppage indicator typically may depict a visual indicia that a tracked asset has stopped for a period of time greater than would be expected, thus indicating decreased efficiency. This stoppage period may, in some implementations, be statically allocated (e.g., set in user preferences for system 105 to a specific number of minutes, hours, etc.). Thus, "Time in Source" stage may be set to a three minute stoppage period floor, while "Time in Destination" stage may be set to five minute stoppage period floor.

In other implementations, the stoppage period may be dynamically allocated by system 105 and/or data gathering apparatus 330. This dynamic allocation may, in some further implementations, be adjusted based solely on vehicle activity 310 stage, while in still other implementations, the dynamic allocation may be based on a rolling, real-time data collection scheme. For example, if system 105 and/or data gathering apparatus 330 detect a slowdown due to environmental conditions that affect all transit stages, all transit stages' stoppage period floors may be incremented by two minutes.

Additionally, stoppage window 780 may be generated and contain information similar to the function of trip interval window 760. Thus, stoppage window may detail information relating to data associated with stoppage indicator 770, including but not limited to, stoppage length, stoppage period start, stoppage period end, and/or the like.

As above with trip interval indicator 750 and/or trip interval window 760, stoppage indicator 770 and/or stoppage window 780 may be linked (e.g., with hyperlinks and/or other dynamic and/or static reference calls) to additional displays, reports, and/or interfaces. For example, clicking on stoppage indicator 770 may direct the viewing user to, and/or generate, a map view (e.g., as shown in trip map interface 800, described elsewhere) overlaying the stoppage area and/or similar information on a map-like display.

FIG. 8 depicts a screenshot of an example trip map interface 800 that may be generated by vehicle tracking system 105. Trip map interface 800 typically may include miniature map 810, map replay controls 820, map replay time indicator 830, map replay source indicator 840, map replay destination indicator 850, map replay quadrant indicators 860, source location numeral 862, source-destination location numeral 864, destination location numeral 866, destination-source location numeral 868, and/or vehicle location window 870.

Trip map interface 800 typically may overlay data stored on system 105 (e.g., in system databases 155) onto a geographically relevant map. For example, if a source location is located in Avon, Ind., and a destination is located in Carmel, Ind., the map generated may be show both of these locations (and the intervening transit lines) clearly, while in other implementations, the map may be of a broader area (e.g., the Indianapolis area).

In some implementations, system 105 may store and retrieve maps and/or map generation information from a database, while in other implementations, system 105 may retrieve maps and/or map information from a third party map source. Further, in some implementations, mini map 810 may be generated and situated on trip map interface 800 to allow a clickable overview of the mapped area, lessening and/or eliminating the need to drag and scroll through the larger map display.

In some implementations, trip map interface 800 typically may allow a replay of events associated with vehicle activity 310. For example, trip map interface 800 may depict map replay controls 820 and map replay time indicator 830. Map replay controls 820 may, for example, be standard multimedia control (e.g., bar-back arrow for back, double bar for pause, right-facing triangle for play, etc.) or any other mechanisms for controlling playback (e.g., buttons with words inscribed therein, an elastic dial having −1 to 1 indicating back-stop-play, and/or the like). Trip map interface 800 typically may also display map replay time indicator 830, indicating the relative time depicted by trip map interface 800. Upon selecting one or more map replay controls 820 (e.g., play), trip map interface 800 may begin animation and map replay time indicator 830 may begin to increment time.

In some implementations, trip map interface 800 may also depict movement of one or more vehicles throughout a recorded and/or real-time vehicle activity 310 using map replay source indicator 840, map replay destination indicator 850, and/or vehicle location window 870. Map replay source indicator 840 typically may depict an indicator on the map where the vehicle activity geographically began (e.g., Avon, Ind. warehouse). This may be, for instance, a colored flag (e.g., green) and/or any other indicator mechanism. Similarly, map replay destination indicator 850 typically may indicate the destination for vehicle activity 310, such as Carmel, Indiana This may be, for instance, a colored flag (e.g., red) and/or any other indicator mechanism.

Additionally, in some other implementations, vehicle location window 870 may depict information regarding an active (relative to trip map interface 800 timeline) asset (e.g., a truck traveling from source to destination). Vehicle location window 870 may include information such as, but not limited to, vehicle identifiers (e.g., first vehicle identifier 715, second vehicle identifier 725, etc.); engine status (e.g., ON/OFF); recorded time; vehicle speed; vehicle heading; odometer reading; geographic coordinates (e.g., latitude, longitude, etc.); associated project; altitude; instant and/or average gas mileage; load capacity; expected arrival at next vehicle activity 310 stage (e.g., destination), and/or the like.

Further, in still further implementations, map replay quadrant indicators 860—including source location numeral 862, source-destination location numeral 864, destination location numeral 866, destination-source location numeral 868—may be generated and situated on trip map interface 800. Map replay quadrant indicators 860 typically may be oriented in a diamond-like formation, where each of the associated quadrant numeral (e.g., elements 862, 864, 866, 868) are located at each point of the diamond-like formation.

Further, in some additional implementations, each respective quadrant numeral may display the number of tracked assets located in each respective vehicle activity stage 310. For example, as depicted in FIG. 8, one asset is located at the source geozone, as indicated by source location numeral 862; one asset is in transit between the source and destination geozones, as indicated by source-destination location numeral 864; two assets are located at the destination geozone, as indicated by destination location numeral 866; and zero assets are in transit between the destination and source geozones, as indicated by destination-source location numeral 868.

In some implementations, these numerals may animate to indicate changes in vehicle activity 310 stages. For example, an arrow between source location numeral 862 and source-destination location numeral 864 may change colors, flash, and/or otherwise change appearance to draw attention to the transfer of an asset from the source geozone stage into the source-to-destination transit stage.

FIG. 9 depicts a screenshot of an example table replay interface 900 that may be generated by vehicle tracking system 105. Table replay interface 900 typically may include table replay legend 910, replay table 920, replay table animator 930, replay table report generator 940, replay table report 950, and/or replay table statistics 960.

Table replay interface 900 typically may depict a tabular report similar to that displayed in report interface 600 and/or detailed report interface 700. Additionally, table replay interface 900 may also include table replay legend 910, which may denote the various table replay interface 900 report elements (e.g., time bar 520 section associations, etc.); replay table 920, which may be animated to show progress of tracked assets throughout a period of time in time bar 520 format; replay table animator 930, which typically may be a button and/or other selectable mechanism to begin animation of table replay interface 900 elements; and replay table report generator 940, which, upon selection, typically may populate table replay interface 900 with an animated tabular report that may synchronously track through vehicle activity 310 data and stages.

In some implementations, replay table interface 900 may also include replay table statistics 960, which denote totals, averages, and/or similar statistical figures for the displayed report data. In some additional implementations, replay table statistics 960 may display only the final statistical figures (e.g., total for all time in source, average for each time to destination, etc.), while in other implementations, instantaneous statistical figures (e.g., total for all time in source up to relative time period, average for each time to destination up to relative time period, etc.).

Figure 10:
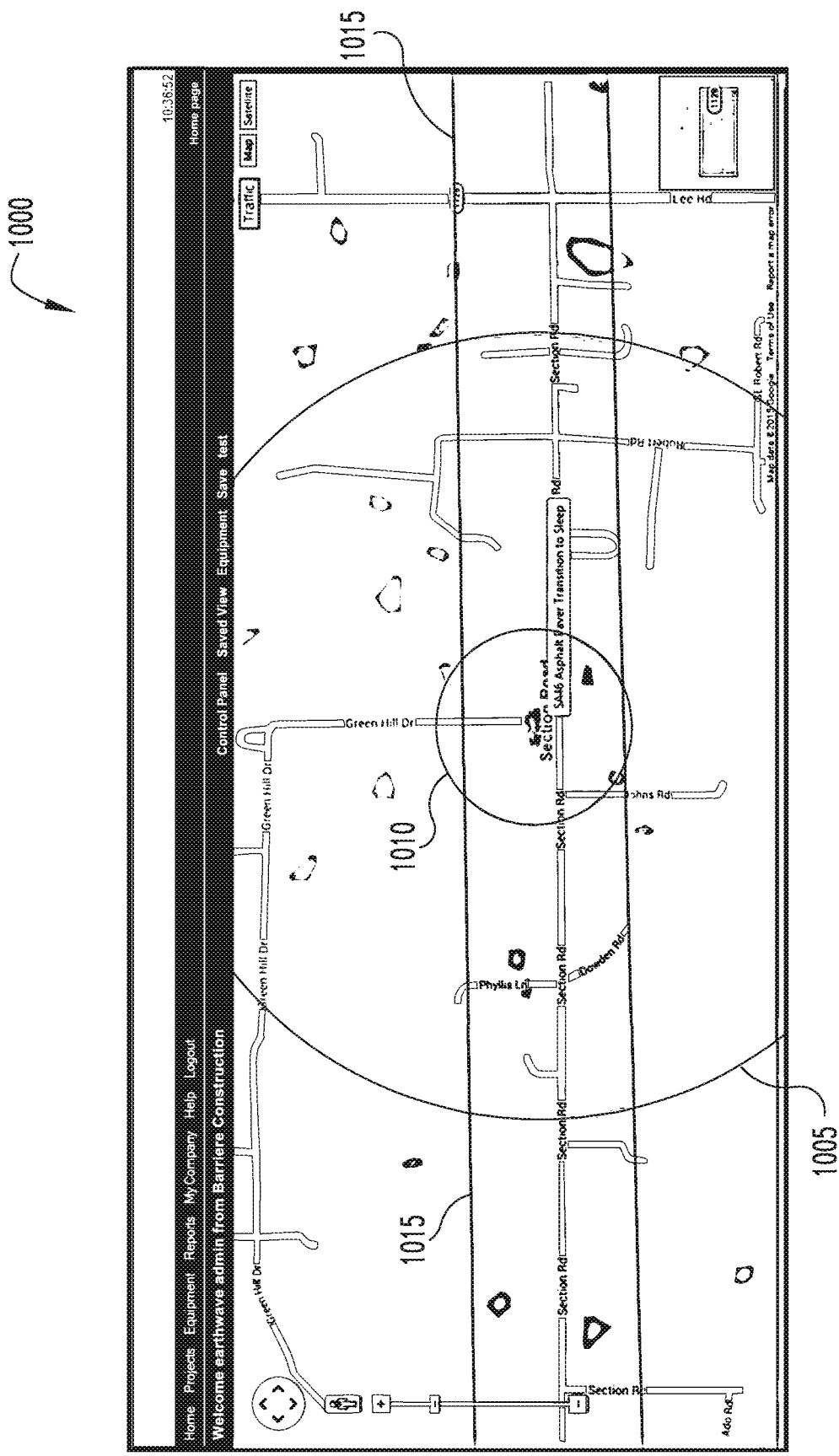
FIG. 10 depicts a screenshot of a multi-geozone example that may be used by the vehicle tracking system.

FIG. 10 depicts a multi-geozone example 1000 that may be used by vehicle tracking system 105. For example, there may be multiple geozones, subgeozones, sub-subgeozones, and/or the like. As depicted in FIG. 10, a first geozone section 1005 forms a concentric ring surrounding an inner, second geozone section 1010 (i.e., a subgeozone section, a first subgeozone, etc.). In some implementations, one or more additional geozones and/or subgeozones 1015 may exist and/or be assigned by system 105, such as horizontal band subgeozone 1015, which may represent a vehicle route that vehicle assets may typically follow.

In some implementations, one or more geozones and/or subgeozones 1015 may be one or more vehicles 115. In this manner, for example, vehicles 115 may form one or more mobile geozones and/or subgeozones 1015 that may be tracked by system 105.

In some further implementations, each separate granularity of geozone section may be uniquely identified in vehicle tracking system 105, such that an asset travelling from one section to the next may individually trigger a notification that the asset has left the first section and is now in a second section.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for efficiently managing tracked assets, comprising the steps of:
   receiving location data via a network from location sensing devices using one or more processors of one or more computers, wherein the location sensing devices are mobile devices situated on multiple different tracked assets;
   storing the location data in a database using the one or more processors;
   determining that multiple tracked assets are moving through geozones of a route while the tracked assets are moving, the one or more processors and the location data, wherein the geozones include a source geozone, a destination geozone, and a delivery transit geozone defining a geographic area between the source and destination geozones, and a return transit geozone defining a geographic area between the destination and the source geozones, and wherein the geozones represent separate and distinct geographic areas;
   displaying a time bar display based on the stored data using the one or more processors, wherein the time bar display includes multiple time bars displayed together, the multiple time bars corresponding to the location of the multiple tracked assets relative to the geozones of the route;
   monitoring timing between arrivals and departures while the tracked assets are moving to determine when spacing between at least two of the multiple tracked assets falls below a predetermined threshold as the multiple tracked assets move through the geozones; and
   automatically sending a notification to an operator via the network to increase or decrease the spacing between the at least two tracked assets so as to maintain at least the spacing between the at least two tracked assets as they traverse the predetermined geozones.

2. The method of claim 1, comprising:
   determining a first time when a first one of the multiple tracked assets crosses a boundary along the route using the one or more processors;
   determining a second time when a second one of the multiple tracked assets passes the boundary using the one or more processors;
   determining that the spacing between the first and second tracked assets is below the predetermined threshold based on the difference between first and second times.

3. The method of claim 1, comprising:
   determining a first time when a first one of the tracked assets enters a specified geozone of the geozones using the one or more processors;
   determining a second time when a second one of the tracked assets leaves the specified geozone using the one or more processors;
   determining the spacing between the first and second tracked assets is below the predetermined threshold based on the difference between first and second times.

4. The method of claim 1, comprising:
   determining that at least one of the multiple tracked assets is traversing the route out of order with respect to the other tracked assets using the one or more processors.

5. The method of claim 4, wherein determining that at least one of the multiple tracked assets is traversing the route out of order includes:
   determining when the at least one tracked asset crosses a boundary between one geozone and another before a second tracked asset of the multiple tracked assets crosses the boundary.

6. The method of claim 4, wherein determining that at least one of the multiple tracked assets is traversing the route out of order includes:
   determining when the at least one multiple tracked asset reaches the destination geozone before another of the tracked assets reaches the destination geozone.

7. The method of claim 4, comprising:
   automatically sending one of the multiple tracked assets a notification to adjust its order on the route relative to another asset of the multiple tracked assets using the one or more processors.

8. The method of claim 4, comprising:
   updating the data stored about the tracked assets to reflect a change in the order of the tracked assets using the one or more processors.

9. The method of claim 1, comprising:
   determining how many tracked assets are in each of the geozones.

10. The method of claim 1, comprising:
    determining a staggered operating pattern for the tracked assets using the one or more processors, wherein the staggered operating pattern defines the spacing between the tracked assets.

11. The method of claim 1, wherein the delivery transit geozone and the return transit geozone represent different geographical areas.

12. The method of claim 1, comprising:
    automatically determining a fleet pattern and wherein the fleet pattern defines a chronological order and spacing of at least two of the multiple tracked assets.

13. The method of claim 1, comprising:
    defining a fleet pattern using the one or more processors, wherein the fleet pattern defines an order and spacing of the at least two tracked assets of the multiple tracked assets.

14. The method of claim 13, comprising:
    sending an update specific to one of the at least two of the tracked assets via the network using the one or more processors, wherein the update includes corrective information indicating that a deviation from a staggered operating pattern has occurred.

15. The method of claim 1, comprising:
    receiving fuel usage data from at least one of the multiple tracked assets traveling the route via the network using the one or more processors;
    determining fuel efficiency for the route based on the fuel usage data using the one or more processors;
    sending a route adjustment notification to the multiple tracked assets via the network indicating a modification to the route based on the fuel efficiency.

16. The method of claim 1, comprising:
    determining traffic pattern information for the route based on the location data using the one or more processors;

sending a route adjustment notification to the multiple tracked assets via the network indicating a modification to the route based on the traffic pattern information.

17. The method of claim 1, comprising:
defining the geozones of the route using the one or more processors.

18. The method of claim 1, wherein at least one of the geozones includes multiple subgeozones.

19. The method of claim 1, wherein the multiple tracked assets includes at least one vehicle.

20. The method of claim 1, wherein the notification is received by a data gathering apparatus of the tracked asset, and wherein the data gathering apparatus is operable to modify activities of the tracked asset.

* * * * *